Dec. 10, 1935.   J. F. KNOX   2,023,959
BEEHIVE
Filed Nov. 4, 1933
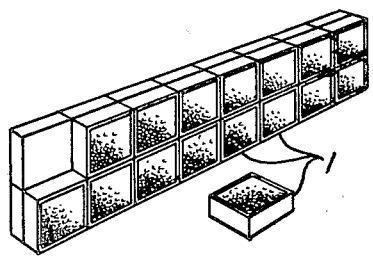
*Fig. 1*
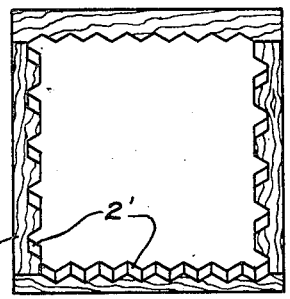
*Fig. 2*
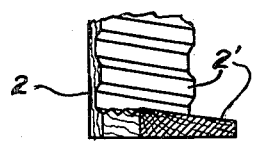
*Fig. 3*
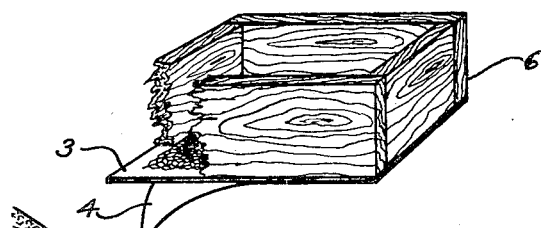
*Fig. 4*
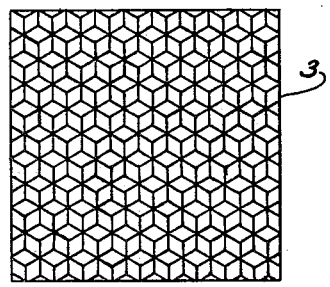
*Fig. 5*
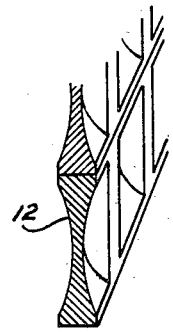
*Fig. 8*
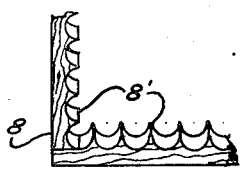
*Fig. 6*
*Fig. 7*
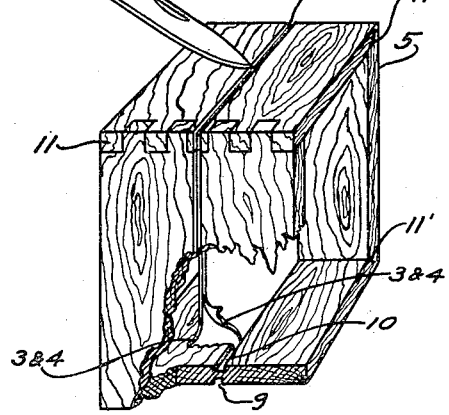
*Fig. 9*
James Frank Knox
INVENTOR
BY Chas Denegre
ATTORNEY Patented Dec. 10, 1935

2,023,959

UNITED STATES PATENT OFFICE 2,023,959

BEEHIVE

James Frank Knox, Birmingham, Ala.

Application November 4, 1933, Serial No. 696,614

4 Claims. (Cl. 6—10)

This invention relates to improvements in the internal parts of a beehive with special reference to the manner of providing means for the storing of honey by the bees.

The object of the present invention is to provide what may be termed an individual container for honey, so arranged that the bees will store the honey in the container and then the container may be removed from the beehive after the same has been filled with honey in shape to serve as an individual portion of honey to anyone desiring same. In other words, the scheme is to provide portions of honey direct from the bees to the consumer without any contact with the actual honey.

The invention consists in the construction and novel combination and arrangement of parts, hereinafter fully described, and illustrated in the accompanying drawing and also pointed out in the claims herein contained.

I am aware of the fact that various schemes and combinations have been used to encourage bees to store honey in different kinds of frames and containers but to my knowledge there is not now and never has been any scheme providing for the bee to store such a small amount as to be an individual portion for human use and so arranged that the individual portion could be handled direct from the hive to the consumer in the original condition.

I reserve the right to manufacture the individual container of this invention of any kind of material that may be suitable for the purpose which may be wood, paper, fabric, "Cellophane," beeswax, any kind of thin metal or anything that may appeal to a bee for the purpose of encouraging the bee to start work.

In the accompanying drawing Fig. 1 represents a perspective view of several of the individual sections with one removed from its regular place in the assembly. Fig. 2 represents a vertical view of the frame of one of the sections showing the sloping grooves in the frame. Fig. 3 is a perspective sectional view of part of Fig. 2. Fig. 4 is a perspective view of the plain type of frame with a bottom attached and partly cut away. Fig. 5 represents one type of bottom or back for the frame. Fig. 6 is a fragmentary plan view of another type of bottom or back showing round indentures. Fig. 7 is a perspective fragmentary view of part of a frame to be used in connection with the type of bottom as shown in Fig. 6. Fig. 8 is a perspective sectional view of a division board to be used between the assemblies of individual sections, and so arranged that the concaves of the division board register with the faces of the sections with a bee space between. Fig. 9 is a perspective view of a frame containing two sections with a double bottom or mid rib and held together by a small web, partly being cut away to show the double bottom or back.

Similar reference numerals refer to similar parts throughout the several views.

1 designates the individual sections. 2 designates the side of a frame of an individual section. 2' designates the groove in the type of frame using grooves. 3 designates the bottom or back of the frame wherein the indentures in the bottom correspond to the grooves in the side walls of the frame. 4 designates a bottom or back of the double type of mid rib where the backs or bottoms are stuck together as used in the double sections as shown in Fig. 9. 5 designates the frame of the double section type of container. 6 designates the frame of the plain type of container as distinguished from the type with the grooves. 7 designates the type of bottom or back using the circular formation as a starter for the bees. 8 designates the type of frame with circular grooves as distinguished from the other type of frame as shown in Fig. 2. 8' designates the pointed edges of the round type grooves. 9 designates the parting groove in the double type sections and indicates where same should be separated by cutting after being removed from the beehive; when the frame is separated at the groove 9 the double bottoms or backs come apart also leaving one complete bottom or back to each individual section. 10 designates the groove on the inside of the double frame for the purpose of holding the double backs or bottoms. 11 indicates the joint in the double frame where the same is put together. 11' indicates the 45 degree angle cut in the frame that permits it to be formed into a square.

The individual sections 1 are placed in the beehive in a frame usually containing 32. The frame containing the individual sections is no part of this invention as the same has been used for some time in beehives. The number of sections placed in a beehive depends on its size and may be varied. 12 designates the division board with concaves in same, and should be placed between every two rows of individual sections with a bee space between the concave board and the sections. The concave division board of Fig. 8 should be placed so as to register the concaves with the sections. Because of this the concave edge should be the same size as the edge of the section. The purpose of this concave being placed adjacent to the section is to encourage the bees to fill the section and keep working outward until he finishes the job leaving the honey comb in an oval or dome shape. This results in having the sections completely filled with honey and rounded off thus producing an attractive appearance.

The regular type of honey comb frame as used in beehives is a square wooden frame about five inches square and about an inch and a half deep. It is generally placed in a larger frame holding four small ones together. The present invention substitutes four little double containers in the same space used by one of the standard container frames mentioned, or in other words there would be 32 individual honey containers in the same space usually occupied in a beehive by 4 standard size large containers. The present invention has two little containers held together by the outer frame which is provided with a groove showing where the same should be separated by cutting with a knife. After the separation is made each little container is about two inches square and about ¾ of an inch deep, the object being to serve a small portion of honey in the comb as it comes out of the beehive.

Having described my invention what I claim is:—

1. A series of small containers for honey in a bee hive, said containers being provided with bottoms having indentures therein serving as starters for the honey comb, and a division board having circular concaves, said concaves being adapted to register with the faces of the small containers with a bee space between the faces of said small containers and the said division board.

2. A series of small containers for honey in a bee hive, said containers being provided with bottoms having indentures therein serving as starters for the honey comb, and a division board having concaves each having a square periphery and merging into a dome, said concaves being adapted to register with the fronts of the small containers with a bee space between the fronts of said small containers and the said division board.

3. A container for honey consisting of a grooved frame, said groove defining a dividing line, and flat members positioned in the groove to divide the frame into two compartments, said flat members forming bottoms and the exterior of the groove forming a guide for a cutting element whereby the container may be divided into two compartments each having a bottom.

4. A container for honey consisting of a frame having inclined grooves in the sides thereof and a bottom arranged at right angles to the sides and having indentures therein which correspond to the grooves in the sides of the frame.

JAMES FRANK KNOX.